US010754048B2

(12) United States Patent
Chang et al.

(10) Patent No.: US 10,754,048 B2
(45) Date of Patent: Aug. 25, 2020

(54) CORRECTING COUNT LOSS IN PET SYSTEM (71) Applicant: Shanghai Neusoft Medical Technology Co., Ltd., Shangai (CN)

(72) Inventors: Jie Chang, Shenyang (CN); Shaolian Liu, Shenyang (CN); Ming Li, Shenyang (CN)

(73) Assignee: Shanghai Neusoft Medical Technology Co., Ltd., Shanghai (CN)

( * ) Notice: Subject to any disclaimer, the term of this patent is extended or adjusted under 35 U.S.C. 154(b) by 190 days.

(21) Appl. No.: 15/872,315

(22) Filed: Jan. 16, 2018

(65) Prior Publication Data

US 2018/0203141 A1 Jul. 19, 2018

(30) Foreign Application Priority Data

Jan. 16, 2017 (CN) .......................... 2017 1 0029306

(51) Int. Cl.
G06F 11/30 (2006.01)
G01T 1/29 (2006.01)
G06T 11/00 (2006.01)

(52) U.S. Cl.
CPC .......... *G01T 1/2985* (2013.01); *G06T 11/003* (2013.01); *G06T 11/005* (2013.01); *G06T 2211/40* (2013.01)

(58) Field of Classification Search
CPC ..................................................... G01T 1/2985
See application file for complete search history.

(56) References Cited

U.S. PATENT DOCUMENTS 5,900,636 A * 5/1999 Nellemann ........... G01T 1/1611
250/363.03
2005/0129170 A1* 6/2005 Watson ................. G01T 1/2985
378/5

* cited by examiner

*Primary Examiner* — Phuong Huynh
(74) *Attorney, Agent, or Firm* — Fish & Richardson P.C.

(57) ABSTRACT

Methods, devices and systems for correcting a count loss in a Position Emission Computed Tomography (PET) system are provided. In one aspect, a method includes: constructing a virtual system including a plurality of virtual crystals, determining, for each of virtual Lines of Response (LORs) in the virtual system, a plurality of real LORs corresponding to the virtual LOR in the PET system, each of the real LORs corresponding to a scanning state of the PET system with a continuous incremental scanning mode, determining a count loss correction factor of the corresponding real LOR in each of the scanning states, determining a count loss correction factor of the virtual LOR according to the determined count loss correction factors of the plurality of real LORs corresponding to the virtual LOR, and performing count loss correction for the virtual LOR according to the determined count loss correction factor of the virtual LOR.

20 Claims, 9 Drawing Sheets

CORRECTING COUNT LOSS IN PET SYSTEM

CROSS REFERENCE TO RELATED APPLICATIONS

This application claims priority to Chinese Patent Application No. 201710029306.3 entitled "CORRECTING COUNT LOSS IN PET SYSTEM" filed on Jan. 16, 2017, the entire content of which is incorporated herein by reference.

TECHNICAL FIELD

The present disclosure relates to correcting a count loss in a Positron Emission Computed Tomography (PET) system.

BACKGROUND

For Positron Emission Computed Tomography (PET), γ-photons emitted from a human body are detected, and an image which can reflect metabolism of different tissues of the human body can be reconstructed based on the detected γ-photons.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, systems, and machine-readable storage mediums for correcting a count loss in a Positron Emission Computed Tomography (PET) system.

One innovative aspect of the subject matter described in the present disclosure can be embodied in methods of correcting a count loss in a Positron Emission Computed Tomography (PET) system that include the actions of constructing a virtual system comprising a plurality of virtual crystals, where each of the virtual crystals is associated with one or more real crystals each having a same relative position relationship with a respective scanning position on a subject in the PET system as the virtual crystal with the respective scanning position in the virtual system; determining, for each of virtual Lines of Response (LORs) in the virtual system, a plurality of real LORs corresponding to the virtual LOR in the PET system, where each of the real LORs corresponds to a scanning state of the PET system with a continuous incremental scanning mode; determining a count loss correction factor of the corresponding real LOR in each of the scanning states; determining a count loss correction factor of the virtual LOR according to the determined count loss correction factors of the plurality of real LORs corresponding to the virtual LOR; and performing count loss correction for the virtual LOR according to the determined count loss correction factor of the virtual LOR.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination.

In some implementations, determining the count loss correction factor of the corresponding real LOR in each of the scanning states includes: determining two respective blocks in the PET system to which two real crystals corresponding to the real LOR belongs; for each real crystal in each of the two respective blocks, determining, in the virtual system, a virtual crystal corresponding to the real crystal and obtaining a single-photon counting rate of the real crystal according to a single-photon counting rate of the determined virtual crystal; obtaining, for each of the two respective blocks, a single-photon counting rate of the block according to the obtained single-photon counting rates of the real crystals in the block; obtaining respective count loss correction factors of the two respective blocks according to the respective single-photon counting rates of the two respective blocks corresponding to the real LOR; and determining the count loss correction factor of the real LOR according to the obtained respective count loss correction factors of the two respective blocks.

Obtaining the single-photon counting rate of the real crystal according to the single-photon counting rate of the virtual crystal can include: determining the single-photon counting rate of the virtual crystal according to counts of single-photons sequentially received by real crystals corresponding to the virtual crystal in an axial direction of the PET system when the real crystals sequentially correspond to a scanning position in the PET system consistent with a scanning position corresponding to the virtual crystal in the virtual system; and obtaining the single-photon counting rate of the real crystal according to the determined single-photon counting rate of the virtual crystal and a respective relative receiving rate of the real crystal corresponding to the virtual crystal in the axial direction of the PET system.

Determining the single-photon counting rate of the virtual crystal can include: determining a single-photon count of the virtual crystal to be a sum of the counts of single-photons received by the real crystals corresponding to the virtual crystal in the axial direction of the PET system; and dividing the single-photon count of the virtual crystal by a scanning time period when the scanning position corresponding to the virtual crystal is scanned in the PET system to obtain the single-photon counting rate of the virtual crystal. The respective receiving rates of the real crystals corresponding to the virtual crystal in the axial direction of the PET system can be predetermined in a stationary scanning mode of the PET system.

In some examples, obtaining, for each of the two respective blocks, the single-photon counting rate of the block according to the single-photon counting rates of the real crystals in the block includes: obtaining a sum of the single-photon counting rates of the real crystals in the block as the single-photon counting rate of the block.

In some examples, obtaining the respective count loss correction factors of the two respective blocks includes: determining the respective count loss correction factor of each of the two respective blocks based on the respective single-photon counting rate of the respective block and predetermined correspondences between respective single-photon counting rates and counting loss correction factors of blocks in the PET system. The predetermined correspondences can be determined in a stationary scanning mode of the PET system that there is substantially no count loss in particular time periods at a minimum radio activity.

Determining the count loss correction factor of the virtual LOR according to the determined count loss correction factors of the plurality of real LORs can include: determining a weighted average for the count loss correction factors of the plurality of real LORs to be the count loss correction factor of the virtual LOR. Performing count loss correction for the virtual LOR according to the determined count loss correction factor of the virtual LOR can include: multiplying a true coincidence counting rate of the virtual LOR by the determined count loss correction factor of the virtual LOR to correct the true coincidence counting rate of the virtual LOR.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of a device and a method consistent with some aspects of the present disclosure described in detail in the appended claims.

A PET device may be influenced by factors such as a structure of a detector system, a crystal integral time, front-end electrons and a coincidence determination circuit, thus, the number of incident photons actually received by the system may be less than the number of photons emitted from a human body. When scanning data obtained by the PET device through a scan is used to perform quantitative analysis for a PET image, it is in demand to perform count loss compensation on the scanning data in a way that the data for PET image reconstruction can be accurate.

PET scanning modes may include a step scanning mode and a continuous incremental scanning mode. For the step scanning mode, when a single bed is scanned, a detector and a patient may stay relatively stationary to each other, and crystals of the detector may collect photons emitted from a corresponding body region of the patient. Regardless of radionuclide decay influence, a single-photon counting rate for single-photons collected by each of the crystals of the detector in the single bed scanning process remains unchanged. In comparison, in the continuous incremental PET scanning process, the detector and the patient may constantly move relatively to each other, and a single-photon count for each of the crystals of the detector may be a sum of counts of single-photons emitted from different body regions of the patient. Moreover, the counting rate of single phonons collected by each crystal in the entire continuous scanning process is changed over time.

In examples of the present disclosure, a virtual system including a plurality of virtual crystals is constructed. Each of the virtual crystals is associated with one or more real crystals each having a same relative position relationship with a respective scanning position on a subject in the PET system as the virtual crystal with the respective scanning position in the virtual system. For each of virtual Lines of Response (LORs) in the virtual system, a plurality of real LORs corresponding to the virtual LOR are determined in the PET system. Each of the real LORs corresponds to a scanning state of the PET system with a continuous incremental scanning mode. A count loss correction factor of the real LOR is determined in each of scanning states, and a count loss correction factor of the virtual LOR is determined according to count loss correction factors of the plurality of the real LORs. Count loss correction for the virtual LOR can be performed according to the count loss correction factor of the virtual LOR.

Figure 1:
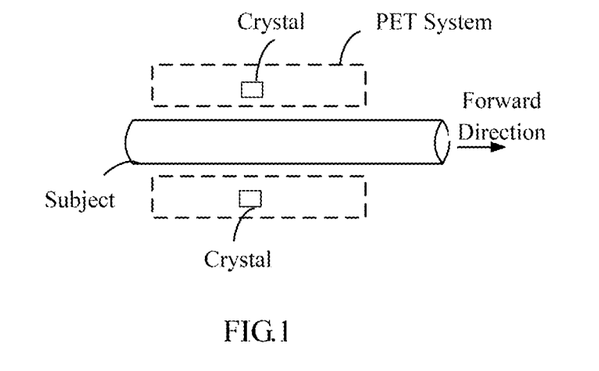
FIG. 1 is a schematic diagram illustrating a scenario of performing a continuous incremental scan for a subject in a PET system according to an example of the present disclosure.

A method of correcting a count loss is provided according to an example of the present disclosure. The method may be used to correct a count loss in a PET system with a continuous incremental scanning mode. In an example, in the continuous incremental scanning mode, a PET scanning bed with a patient lying therein moves at a constant rate, and the PET system performs a continuous scan for the patient. FIG. 1 is a schematic diagram illustrating a scenario of performing a continuous incremental scan on a subject (e.g., a patient) in a PET system. An arrow in FIG. 1 indicates a forward direction for the subject (e.g., the patient lies on the scanning bed and the scanning bed moves along the direction of the arrow at a constant rate).

Figure 2:
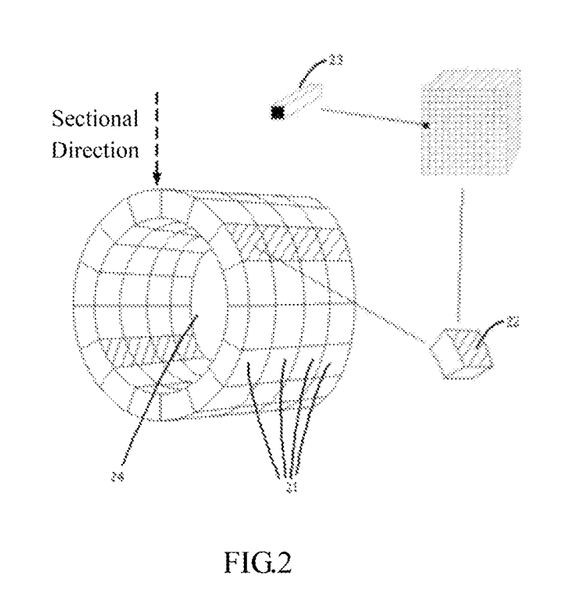
FIG. 2 is a stereoscopic schematic diagram illustrating a PET system according to an example of the present disclosure.

The PET system in FIG. 1 is actually a section of the PET system. The PET system may include a plurality of block rings. FIG. 2 is a stereoscopic schematic diagram illustrating a PET system. FIG. 2 illustrates four block rings 21 (the actual number of block rings may be larger). A block can be a detector module. Each of the block rings may be assembled with a plurality of blocks 22, and each of the blocks 22 may include a plurality of crystals 23. The plurality of block rings may constitute an internal space 24 in which the subject is lied, and single-photons, e.g., γ-photons, produced by positron annihilation events occurring in the internal space may be received by crystals 23 in the block rings. The schematic diagram of the PET system in FIG. 1 may be obtained, for example, by cutting out the PET system along a direction indicated by a dotted arrow in FIG. 2. Further, in FIG. 2, the PET system may include a plurality of crystal rings. The plurality of crystal rings may be a ring-shaped crystal string along a same direction of the block rings 21, and a block ring may include a plurality of individual crystals. For example, a ring may include 100 crystals.

Figure 3:
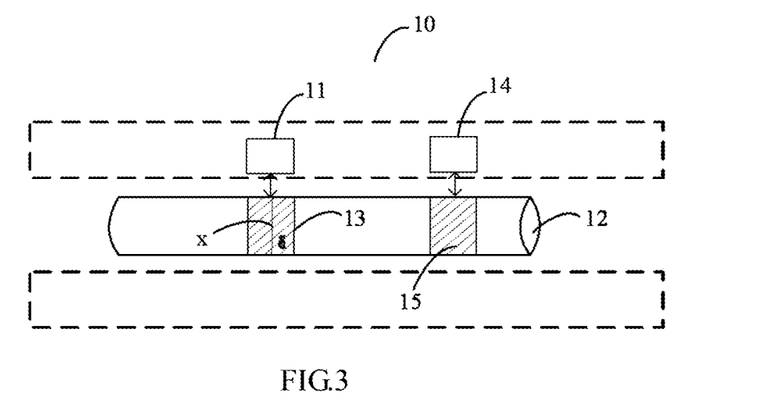
FIG. 3 is a sectional view illustrating a virtual system according to an example of the present disclosure.

According to an example of the present disclosure, a real PET system may be virtualized to be a virtual PET system (abbreviated as a virtual system). In FIG. 3, the virtual system 10 may include a number of virtual crystals. For example, a size of a virtual crystal 11 may be same as that of a crystal of the real PET system. The virtual PET system 10 may include a plurality of block rings same as those in the real PET system in FIG. 2. In FIG. 3, a sectional view of a virtual system is illustrated. The virtual system may differ from the real PET system in that the virtual system 10 may include block rings more than the real PET system (e.g., the real PET system includes 20 block rings, and the virtual system 10 includes 40 Block rings). For example, in FIG. 1, a length of the real PET system in a forward direction (which can be a Z-axis hereinafter) is smaller than a length of a subject; in FIG. 3, a length of the virtual system 10 in the Z-axis direction is longer than the length of the subject. In this way, the continuous incremental scanning mode for the subject in the PET system can be virtualized to be a fixed scanning mode in the virtual PET system 10, thus, the subject may be scanned for each region by just staying stationary in the PET system.

Further, for the virtual PET system 10 in FIG. 3, each virtual crystal fixedly corresponds to a scanning position of the subject. For example, in FIG. 3, the virtual crystal 11 corresponds to the scanning position 13 of the subject. The length of the virtual crystal 11 may be same as a length of a crystal of a real PET system, thus, the scanning position corresponding to the virtual crystal may have a length equal to the length of the virtual crystal. For example, it is assumed that x is a point position of a subject 12, and a region of (x−δ, x+δ] can be the above scanning position 13, where δ is a half of the length of the crystal. A scanning position 15 may correspond to a virtual crystal 14. Each virtual crystal corresponds to a scanning position of the subject 12.

As described above, each virtual crystal corresponds to a scanning position. In an example, when the virtual crystal 11 corresponds to the scanning position 13, the scanned subject 12 stays stationary in the virtual system 10, and the scanning position 13 of the subject directly faces the virtual crystal 11 on the position (in a direction perpendicular to the Z-axis), which is similar to one-to-one correspondence between a crystal and a scanning position when the scanning bed remains stationary in the step scanning mode.

Figure 4:
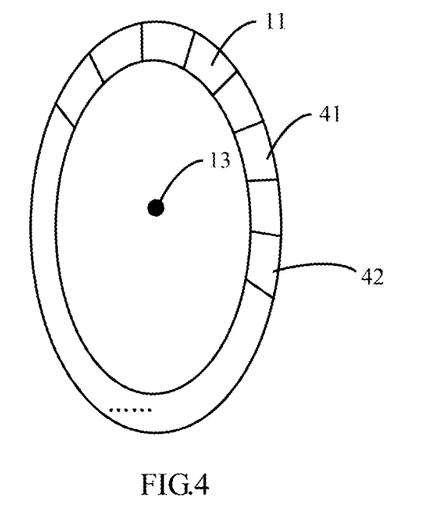
FIG. 4 is a schematic diagram illustrating a crystal ring according to an example of the present disclosure.

Further, as described above, FIG. 3 illustrates a section of the virtual system. The virtual system is a ring-shaped detection device similar as a stereoscopic system in FIG. 2. When a subject is placed in an internal space 24 of the virtual system, there are a plurality of virtual crystals corresponding to a scanning position of the scanned subject, which constructs a crystal ring. In FIG. 4, the scanning position 13 is taken as an example. A plurality of crystals in a ring such as the virtual crystal 11, a virtual crystal 41 and a virtual crystal 42 are virtual crystals corresponding to the scanning position 13. In an example, a scanning position corresponds to a plurality of virtual crystals in a ring which has different angles relative to the scanning position. In an example, when a patient lies in a scanning bed in the internal space 24 in FIG. 2, e.g., inside a ring-shaped detection device, each position of the patient can correspond to crystals in a ring.

In an example, the virtual system 10 is virtualized as a PET system which is similar as a PET system with the step scanning mode. When the subject 12 is scanned in a real PET system with the continuous incremental scanning mode, the scanning bed constantly moves. In the virtual system 10, the scan is performed in a case that the scanning bed remains stationary. In an example, in FIG. 3, the subject 12 remains stationary in the virtual system 10 when the scan is performed on the subject 12. Each virtual crystal in the virtual system 10 corresponds to a scanning position of the subject.

A process of calculating a single-photon counting rate of a virtual crystal in the virtual system 10 above is described below. And the single-photon counting rate of the virtual crystal can be used in the method of correcting a count loss.

A count of single-photons obtained by each virtual crystal in the virtual system is determined. The count of single-photons is the number of the single-photons received by the virtual crystal in the scanning process (e.g., γ-photons produced by positron annihilation events).

In an example, a single-photon count of a virtual crystal is calculated as follows.

A single-photon count of each virtual crystal is a sum of single-photon counts of a plurality of real crystals in the real PET system. It can be describe below which real crystals corresponds to the virtual crystal, and which part of single-photons received by the real crystals corresponding to the virtual crystal is counted to be the single-photon count of the virtual crystal accompanying with FIG. 5.

Figure 5:
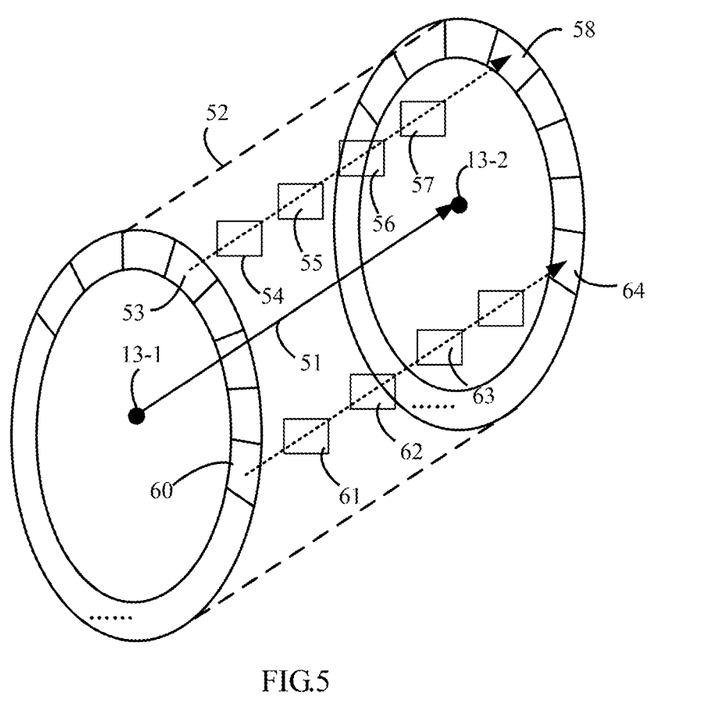
FIG. 5 is a schematic diagram illustrating a correspondence between a crystal and a scanning position according to an example of the present disclosure.

In FIG. 5, the scanning position 13 on the subject 12 is taken as an example. In the virtual PET system, the scanning position 13 corresponds to the virtual crystal 11. In the continuous incremental scanning mode of the real PET system, the subject 12 moves accompanying with the scanning bed, and the scanning position 13 of the subject moves accordingly. FIG. 5 illustrates two endpoints for a process of scanning the scanning position 13. The scanning position 13 starts to be scanned from a position denoted as 13-1, moves along with the subject in the direction of the arrow 51 (which is the forward direction of the scanning bed) and stops being scanned when the scanning position 13 moves to a position denoted as 13-2 (e.g., the scanning position 13 moves out of the real PET system). FIG. 5 further illustrates crystal rings corresponding to the two endpoints, where a dotted line 52 indicates that there are a plurality of successive crystal rings between the two crystal rings corresponding to the two endpoints. The PET system in FIG. 5 is a stereoscopic real PET system, and only two crystal rings at two end sides of the real system are illustrated in FIG. 5.

Still referring to FIG. 5, real crystals 53 to 58 (FIG. 5 illustrates a part of real crystals, and the actual number of real crystals may be greater) forms a crystal string. A direction of the crystal string may be the forward direction indicated by the arrow 51. Moreover, in the process of scanning the scanning position 13 moving from the position 13-1 to the position 13-2, there may be respective time periods when different real crystals in the crystal string sequentially corresponds to the scanning position 13. For example, when the scanning position 13 is in the crystal ring at a leftmost end in FIG. 5, the real crystal 53 is at a position corresponding to the scanning position 13. When the scanning position 13 is in the crystal ring at a rightmost end in FIG. 5, the real crystal 58 corresponds to the scanning position 13, and each of the real crystals in the crystal string such as the real crystal 54, the real crystal 55 can sequentially correspond to the scanning position 13.

Figure 6:
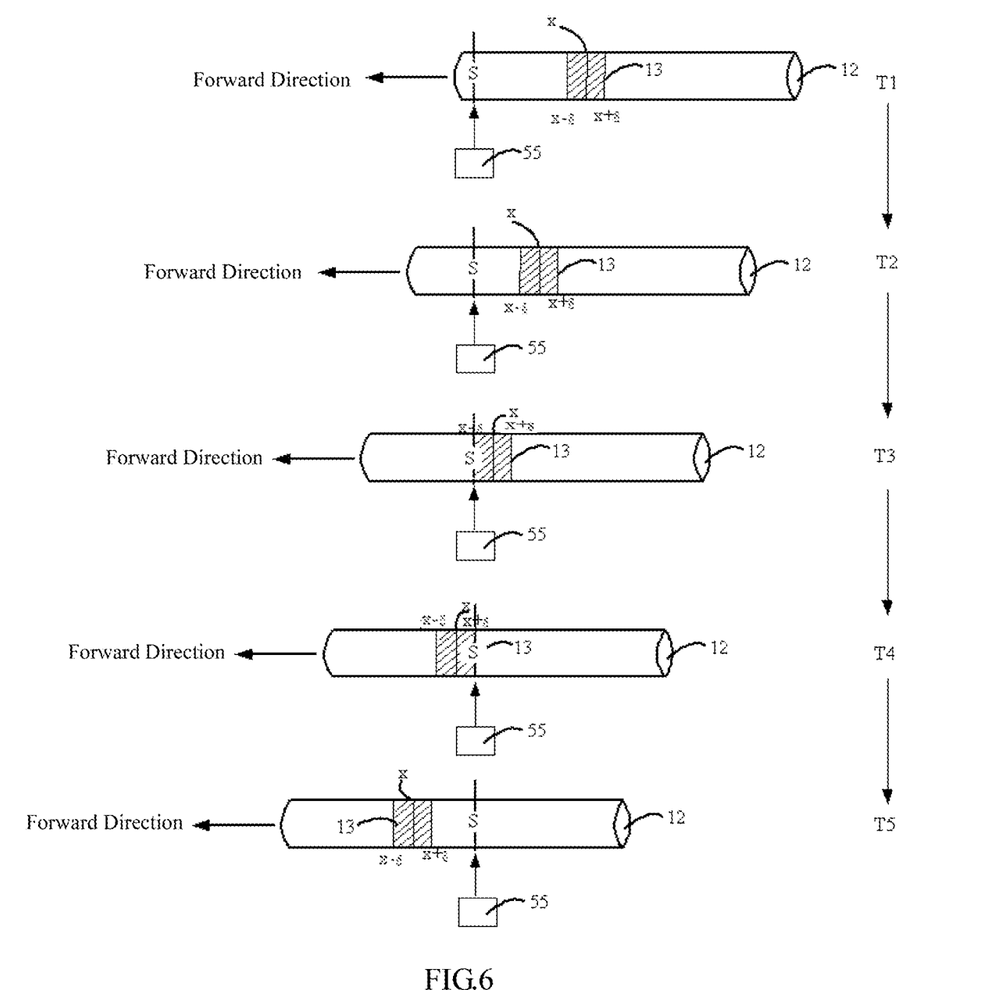
FIG. 6 is a schematic diagram illustrating a motion process that a crystal sequentially correspond to a scanning position according to an example of the present disclosure.

FIG. 6 is a schematic diagram illustrating a motion process that a particular crystal 55 corresponds to the scanning position 13. The real crystal 55 in the real PET system is taken as an example. FIG. 6 illustrates five time points in the continuous incremental scanning process, which are denoted as T1, T2, T3, T4 and T5, respectively. Along an order from T1 to T5, the subject 12 may move at a constant speed in the forward direction indicated by the arrow. The position of the real crystal 55 is fixed in the real PET system. When the subject 12 moves in the forward direction, the scanning position of the subject 12 corresponding to the center line S of the real crystal 55 is constantly changed. At T3, the left side "x−δ" of the scanning position 13 (x represents the center line of the scanning position 13, and δ represents a half of the length of a real crystal) reaches the center line S of the real crystal 55. At T4, the right side "x+δ" of the scanning position 13 reaches the center line S of the real crystal 55. In the time period from T3 to T4, the real crystal 55 may correspond to the scanning position 13.

Based on the above principle, in the continuous incremental scanning process, there is a time period similar as that in FIG. 6 for each of the real crystals in the crystal string from the real crystal 53 to the real crystal 58 in FIG. 5. In the time period, the real crystal corresponds to the scanning position 13. The number of single-photons received by the real crystal in the time period is a part of a count of single-photons received by the virtual crystal 11 corresponding to the scanning position 13 in the virtual system. In an example, the number of photons received by each of the real crystals in the crystal string from the real crystal 53 to the real crystal 58 when the real crystal corresponds to the scanning position 13 may be summed together to obtain the single-photon count of the virtual crystal 11 corresponding to the scanning position 13 in FIG. 4. A relationship between the virtual crystal 11 and the real crystal string can be seen in FIGS. 4 and 5. When the scanning position 13 is at a center of the crystal ring, the position of the virtual crystal 11 in the virtual crystal ring is same as the position of each of the real crystals in the real crystal string in respective crystal rings. In an example, a relative position relationship of each real crystal and the scanning position when the real crystal corresponds to the scanning position is the same as the relative position relationship of the virtual crystal and the scanning position (the rings are 360 degrees, and the real crystal and the virtual crystal have a same angular position in respective crystal rings).

Similarly, in FIG. 5, another crystal string includes real crystals 60 to 64. The number of single-photons received by each of these real crystals when the real crystal corresponds to the scanning position 13 may be summed together to obtain a single-photon count of the virtual crystal 42 in FIG. 4. A count single-photon of another virtual crystal may be obtained according to the above principle, which is not repeatedly described herein. In an example, a single-photon count of a virtual crystal is obtained by accumulating the number of single-photons sequentially received by different real crystals in a crystal string when the real crystals sequentially correspond to a scanning position same as the scanning position corresponding to the virtual crystal. A count of single-photons received by a real crystal in a crystal string when the real crystal corresponds to a scanning position may be a single-photon count component, and a plurality of single-photon count components sequentially received by a plurality of real crystals in the crystal string in the real PET system when the real crystals sequentially corresponds to the scanning position may be obtained. The single-photon count components may be summed to obtain the single-photon count of the virtual crystal corresponding to the scanning position.

Based on the method above, for each of the virtual crystals, the single-photon count of the virtual crystal in the virtual PET system may be obtained in the above scanning process. For a certain virtual crystal, a scanning position of a subject corresponding to the virtual crystal is determined, a crystal string corresponding to the virtual crystal may be determined in the real PET system, and the single-photon count of the virtual crystal may be obtained by accumulating the number of single-photons sequentially received by different real crystals when the real crystals in the crystal string sequentially corresponds to the scanning position in the entire scanning process.

A virtual crystal i is taken as an example. A single-photon count of the virtual crystal i may be obtained. The single-photon count of the virtual crystal i may be divided by a scanning time period when a scanning position corresponding to the virtual crystal i is scanned in the real PET system to obtain the single-photon counting rate $s_i$ of the virtual crystal i. The single-photon counting rate $s_i$ is a value obtained by dividing a total count by the time period. The scanning time period may be a time period when the scanning position passes through the real PET system, such as a time period when the scanning position 13 moves from the position 13-1 to the position 13-2 in FIG. 5.

In the example above, the PET system of performing continuous incremental scanning is virtualized to be a virtual system. The PET system in FIG. 1 can be a real system. Moreover, a crystal in the virtual system may be a virtual crystal, such as a virtual crystal 11, a crystal in the real system can be a real crystal, such as a real crystal 53. Further, in examples below, a Line of Response (LOR) in the virtual system can be a virtual LOR, and a LOR in the real system can be a real LOR.

When the count loss in the PET system of performing continuous incremental scanning is to be corrected, a single-photon counting rate of a virtual crystal as described above can be used, and two parameters may further be used, e.g., a correspondence between a single-photon counting rate and a count loss correction factor of a block, which may be recorded in a correspondence search table, and a relative receiving rate of each of the real crystals in the real PET system. It is described below how to obtain the two parameters.

A correspondence between a single-photon counting rate and a count loss correction factor of the block can be obtained as follows.

A phantom injected with a radiopharmaceutical may be scanned in a stationary state. The phantom (such as a cylindrical phantom) may uniformly emit rays in the PET system with a high initial activity (such as 50 mCi). The initial activity can be higher than the activity when a clinical patient is scanned. In a plurality of time periods, the scanning may be respectively performed. As the pharmaceutical is decaying with time, its activity may become lower in a way that there is almost no count loss in last several time periods.

For each scanning time period i, an average pharmaceutical activity $a_i$ may be calculated according to the pharmaceutical decay. A system real true coincidence counting rate $t_i$ may be associated with true coincidence counting rates of blocks measured in the PET system. For example, the system real true coincidence counting rate $t_i$ can be equal to a sum of true coincidence counting rates of different blocks measured in the PET system. The system single-photon counting rate $s_i$ is associated with single-photon counting rates of blocks in the PET system. For example, the system single-photon counting rate $s_i$ can be equal to an average of single-photon counting rates of different blocks in the PET system.

There can be no count loss in particular time periods at a minimum activity. In the case that there is no count loss, the system real true coincidence counting rate is in a direct proportion to an activity. Thus, a proportional relationship between true coincidence counting rate and activity in the case that there is no count loss may be obtained according to the system real true coincidence counting rates and activities in the particular time periods at the minimum activity. For example, a proportional relationship between true coincidence counting rate and activity in the case that there is no count loss can be obtained based on $a_i$ and $t_i$ in M time periods as follows:

$$\lambda = [\Sigma(t_i/a_i)]/M \text{ (or } \lambda = (\Sigma t_i)/(\Sigma a_i)) \quad (1),$$

where $\lambda$ is a coefficient representing the proportional relationship.

It is assumed that the scanning is performed in N time periods numbered sequentially to be 1, 2 . . . N−1, N, and there is no count loss for the system in the last M time periods. The formula (1) above may be expressed as follows:

$$\lambda = \left[ \sum_{i=N-M+1}^{N} ((t/a_i)) \right] / M \text{ or } \lambda = \left( \sum_{i=N-M+1}^{N} t_i / \left( \sum_{i=N-M+1}^{N} a_i \right) \right). \quad (2)$$

For each scanning time period i, a system ideal true coincidence counting rate $\bar{t}_i$ may be obtained. The system ideal true coincidence counting rate $\bar{t}_i$ is associated with true coincidence counting rates of blocks in a case that there is no count loss. For example, the system ideal true coincidence counting rate $\bar{t}_i$ can be equal to a sum of true coincidence counting rates of different blocks in the case that there is no count loss. The system ideal true coincidence counting rate $\bar{t}_i$ can be calculated as follows:

$$\bar{t}_i = \lambda a_i \quad (3).$$

Then, a count loss correction factor $\eta_i = \bar{t}_i/t_i$ may be obtained according to the system real true coincidence counting rate $t_i$ and the system ideal true coincidence counting rate $\bar{t}_i$. The obtained count loss correction factor $\eta_i$ can represent a proportional relationship between an ideal true coincidence counting rate and a real true coincidence counting rate of an entity, e.g., a system, a block, or a crystal. A functional relationship $\eta = f(s)$ between a single-photon counting rate and a count loss correction factor of a block is established. The correspondence between the single-photon counting rate and the count loss correction factor of the block can be obtained according to the functional relationship.

The function $f(s)$ may be a polynomial function or a piecewise function.

For example, when the above function is the polynomial function, this function may be expressed to be $$f(s) = \sum_{k=0}^{N} a_k s^k,$$

where s represents a single-photon counting rate of a block and $a_k$ is a polynomial coefficient. The function may be obtained by polynomial fitting according to data sequences $s_i$ and $\eta_{ji}$.

For example, when the above function is a piecewise function, the function may be expressed as follows:

$$f(s) = \begin{cases} \eta_i, & s_i \\ \text{obtained based on interpolation,} & \text{others} \end{cases} \quad (4)$$

According to the interpolation method, $\eta_i$ corresponding to $s_i$ near s may be obtained by linear interpolation or another interpolation method.

A relative receiving rate of a crystal is obtained as follows.

The relative receiving rate of a crystal may be $\omega = M/N$ when N single-photons are emitted to the crystal in a unit time period and M single-photons are identified.

To obtain the relative receiving rate of each crystal in the PET system at different activities, a cylindrical water phantom with an axial length longer than an axial length of the PET system may be placed at a center of the PET system with a high initial activity (such as 50 mCi, higher than the activity when a clinical patient is scanned), and a scan is performed in a plurality of time periods. As the pharmaceutical agent is decaying with time, its activity may become lower. For example, at a pharmaceutical activity $D_t$ in a time period, the phantom is scanned in a stationary state, and counting rates of single-photons emitted to crystals at different positions are the same in the time period. Single-photon counts for all the crystals may be obtained. The relative receiving rate of a crystal may be calculated through the formula as follows:

$$\omega_i(\bar{S}(t)) = S_i(t)/\bar{S}(t) \quad (5),$$

where i represents a crystal number, $S_i(t)$ represents a single-photon counting rate of the crystal i, $\bar{S}(t)$ represents an average value of single-photon counting rates of crystals at a same position as the crystal i in respective single rings, e.g., an average value of single-photon counting rates of a string of crystals in an axial direction at a same position in respective single rings. The relative receiving rate of the crystal is a relative value to different crystals in the crystal string in the axial direction. A functional relationship $\omega_i(\overline{S}(t))$ may be established according to test results for different doses. In this way, when the single-photon counting rates $\overline{S}(t)$ for a string of crystals in the axial direction are obtained, a relative receiving rate $\omega_i(\overline{S}(t))$ of a crystal i can be determined based on the predetermined relationship.

It is described above how to obtain the single-photon counting rate of the virtual crystal, the correspondence between the single-photon counting rate and the count loss correction factor of the block, and the relative receiving rate of the crystal. A method of correcting a count loss is described in examples below. In a PET system of performing continuous incremental scanning, the correction may be performed according to a virtual LOR in a virtual system. For example, count loss correction may be performed for data of each virtual LOR according to a count loss correction factor corresponding to the virtual LOR.

Figure 7:
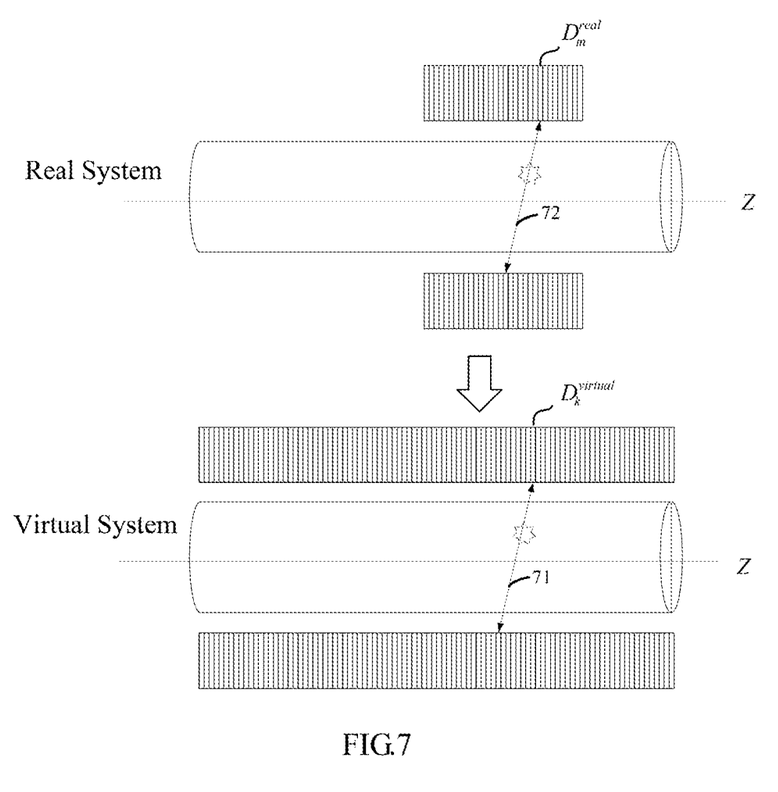
FIG. 7 is a schematic diagram illustrating that a real system corresponds to a virtual system according to an example of the present disclosure.

The count loss correction factor corresponding to each virtual LOR may be calculated. In FIG. 7, a virtual LOR 71 in a virtual system is taken as an example, where the virtual LOR 71 corresponds to two virtual crystals, one of which is virtual crystal $D_k^{virtual}$. Further, the virtual LOR 71 corresponds to a plurality of real LORs in a real system, and a count loss correction factor of the virtual LOR may be obtained according to the count loss correction factors of the plurality of the real LORs. For example, a real LOR 72 in FIG. 7 is one of the real LORs corresponding to the virtual LOR 71 and the real LOR 72 corresponds to two real crystals, one of which is real crystal $D_m^{real}$.

Figure 8:
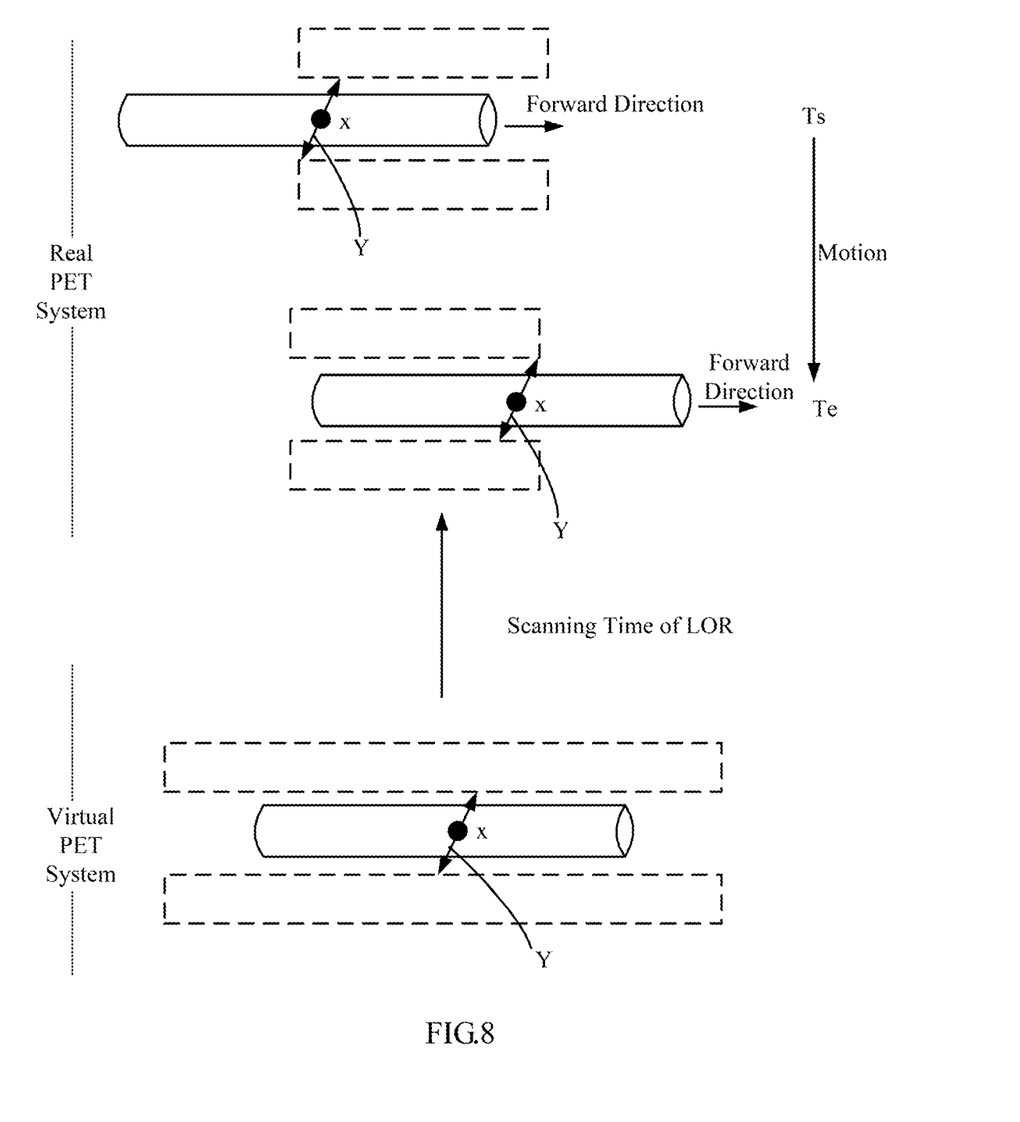
FIG. 8 is a schematic diagram illustrating scanning time of a LOR according to an example of the present disclosure.
Figure 9:
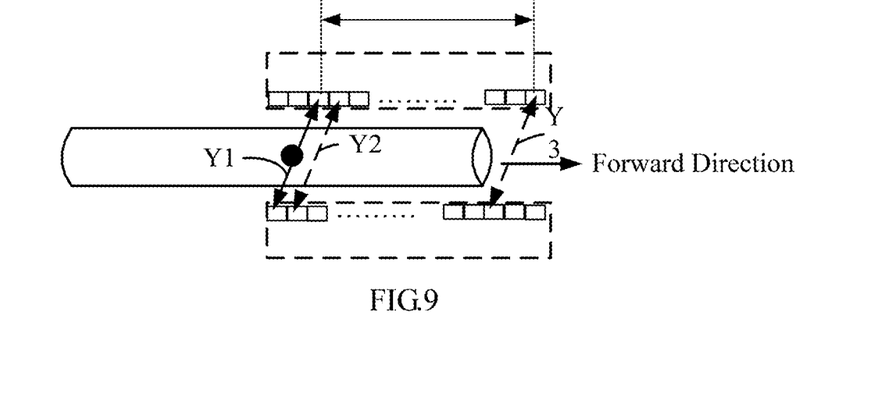
FIG. 9 is a schematic diagram illustrating scanning states according to an example of the present disclosure.

It is described that a plurality of real LORs corresponding to a virtual LOR in conjunction with FIGS. 8 and 9. The plurality of real LORs are different LORs corresponding to the virtual LOR at respective sub-periods in the scanning time period of an LOR, and each real LOR corresponds to a scanning state.

For example, FIG. 8 illustrates that the scanning time period for the LOR is the scanning time for the LOR in the real PET system. For example, in a virtual PET system in FIG. 8, a scanning position x of a subject corresponds to a LOR Y. Correspondingly, in a time period from starting scanning to stopping scanning (a time period for the subject to move from time $T_s$ to time $T_e$ in FIG. 8) in a real PET system, the LOR Y moves from an end to another end of the real PET system.

In FIGS. 8 and 9, in the LOR scanning time $T_s$ to $T_e$, the LOR Y moves from an end to another end crystal by crystal. A state that the LOR Y corresponds to each crystal may be a scanning state. For example, the LOR Y is a scanning state when the real LOR Y1 is at the leftmost end at time $T_s$ in FIG. 8. Another scanning state is entered when the LOR Y moves rightward by a crystal in the forward direction to obtain another real LOR Y2. A last scanning state corresponding to a real LOR Y3 is entered at time $T_e$. Each scanning state corresponds to a real LOR. The process of moving from $T_s$ to $T_e$ is associated with a plurality of real LORs corresponding to the virtual LOR 71 in FIG. 7. The real LOR 72 in FIG. 7 is one of the LORs corresponding to the virtual LOR 71 which corresponds to a scanning state.

A count loss correction factor of a real LOR may be determined according to respective blocks to which two real crystals corresponding to the real LOR belongs. For example, the count loss correction factor of the real LOR may be obtained according to count loss correction factors of the two blocks corresponding to the real LOR. As described above, a correspondence search table for single-photon counting rates and count loss correction factors of blocks is obtained. A single-photon counting rate of a block may be obtained, and the count loss correction factor of the block may be obtained based on the correspondence search table.

Figure 10:
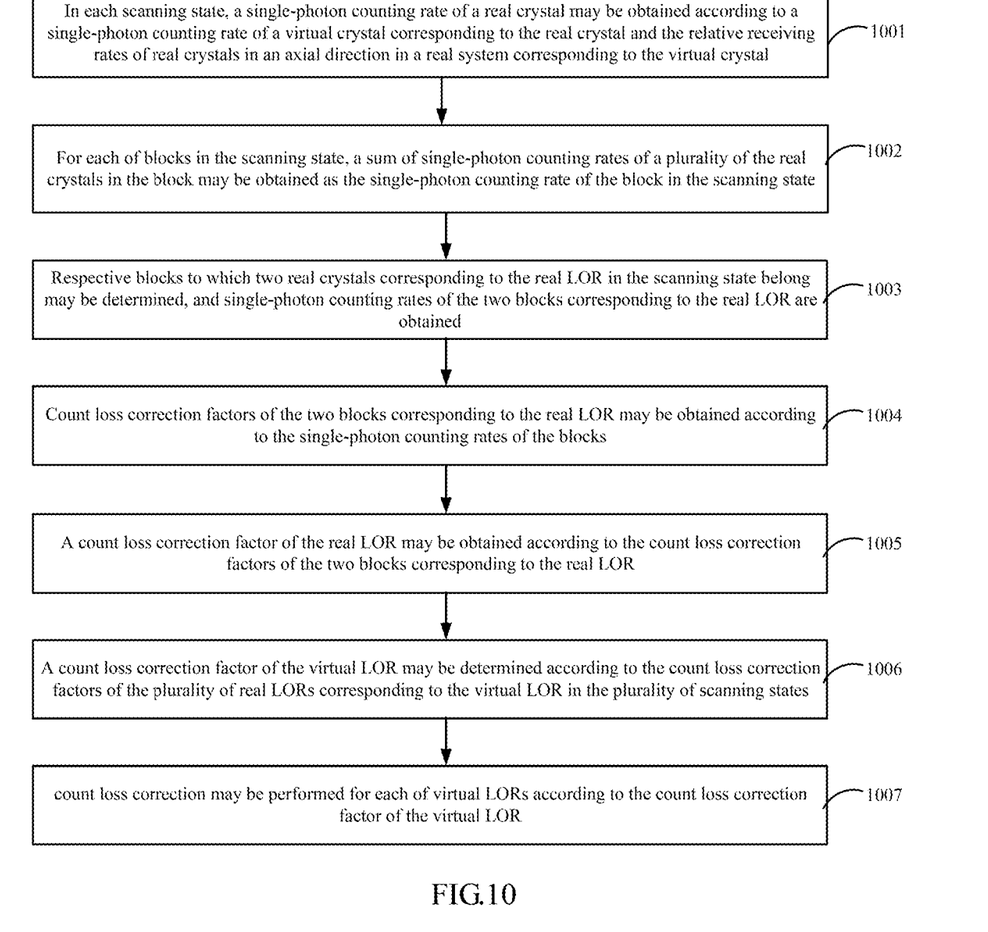
FIG. 10 is a flowchart illustrating a method of correcting a count loss according to an example of the present disclosure.

On the basis of the principle above, in FIG. 10 a method of correcting a count loss is provided according to an example of the present disclosure. In the method, count loss correction is performed for data of a virtual LOR as an example. Another virtual LOR can be corrected according to the same principle. In FIG. 10, the method may include procedures as follows.

At step 1001, in each scanning state, a single-photon counting rate of a real crystal may be obtained according to a single-photon counting rate of a virtual crystal corresponding to the real crystal and the relative receiving rates of real crystals in an axial direction in a real system corresponding to the virtual crystal.

As described above, a virtual LOR may correspond to a plurality of real LORs in the real PET system, and each real LOR may correspond to a scanning state. For example, Y1 in FIG. 9 is in a scanning state, and Y2 may correspond to another scanning state when a scanning bed moves rightwards a crystal.

The real LOR 72 in FIG. 7 is taken as an example. In the real PET system, a single-photon counting rate of each real crystal may be obtained. A real crystal $D_m^{real}$ is taken as an example, a single-photon counting rate of another real crystal may be obtained by the same method as $D_m^{real}$.

In FIG. 7, a real crystal $D_m^{real}$ corresponds to a virtual crystal $D_k^{virtual}$, which is similar as that the crystal string composed of real crystals 53 to 58 corresponds to the virtual crystal 11 in FIG. 5. The real crystal $D_m^{real}$ is one of real crystals corresponding to the virtual crystal $D_k^{virtual}$. A single-photon counting rate $s_k^{virtual}$ of the virtual crystal $D_k^{virtual}$ may be obtained based the method above. The single-photon counting rate of the real crystal $D_m^{real}$ may be obtained according to the relative receiving rates of the real crystals corresponding to $D_k^{virtual}$ in the axial direction in the real system.

In an example, the crystal $D_k^{virtual}$ in the virtual crystals may correspond to an axial string of real crystals at a position of the crystal $D_m^{real}$ which may be denoted as $D_1^{real}, D_2^{real}, \ldots, D_Z^{real}$, e.g., there are Z real crystals corresponding to the virtual crystal $D_k^{virtual}$. The single-photon counting rate of the virtual crystal $D_k^{virtual}$ is an average value of counting rates of a string of crystals $D_1^{real}, D_2^{real}, \ldots, D_Z^{real}$. When the single-photon counting rate $s_k^{virtual}$ of $D_k^{virtual}$ is obtained, the average counting rate of the string of the crystals $D_1^{real}, D_2^{real}, \ldots, D_Z^{real}$ may be obtained, and the relative receiving rates $\omega_1, \omega_2, \ldots, \omega_Z$ for the string of crystals may be obtained. The single-photon counting rate corresponding to the $D_m^{real}$ in the real crystals is $$s_m^{real} = \frac{Z\omega_m}{\sum_j \omega_j} s_k^{virtual},$$

where $\omega_m$ is the relative receiving rate of the real crystal $D_m^{real}$.

Single-photon counting rates of the real crystals in the scanning state of the real LOR 72 may be obtained by the same method as above. In an example, when the real LOR 72 is in the scanning state, a single-photon counting rate of another real crystal may be calculated by using a single-photon counting rate of another virtual crystal corresponding to the another real crystal. For example, to calculate a single-photon counting rate of another real crystal rather than the real crystal $D_m^{real}$ in the scanning state of the LOR 72, the virtual crystal corresponding to the another real crystal is determined, a single-photon counting rate of the virtual crystal is obtained, and the single-photon counting rate of the another real crystal is calculated according to the formula above.

As described above, in the scanning state corresponding to each of the real LORs, a single-photon counting rate of each of the real crystals in the real system may be calculated.

At step 1002, for each of blocks in the scanning state, a sum of single-photon counting rates of a plurality of the real crystals in the block may be obtained as the single-photon counting rate of the block in the scanning state.

A PET system may include a plurality of blocks, and each of the blocks includes a plurality of real crystals. In the scanning state, the single-photon counting rates of the real crystals are obtained in the step 1001. In the step 1002, a sum of single-photon counting rates of a plurality of real crystals in a same block may be obtained as the single-photon counting rate of the block.

At step 1003, respective blocks to which two real crystals corresponding to the real LOR in the scanning state belong may be determined, and single-photon counting rates of the two blocks corresponding to the real LOR are obtained.

Each of the real LORs corresponding to a virtual LOR is associated with two real crystals. For example, a real crystal corresponding to the real LOR72 is $D_m^{real}$ which belongs to a block. Each of two real crystals corresponding to the real LOR belongs to a block, and the real LOR corresponds to two respective blocks accordingly. In step 1002, the single-photon counting rates of the two respective blocks corresponding to the real LOR are obtained. The single-photon counting rates of two blocks corresponding to each real LOR can be obtained through the same way.

At step 1004, count loss correction factors of the two blocks corresponding to the real LOR may be obtained according to the single-photon counting rates of the blocks.

A correspondence between a single-photon counting rate and a count loss correction factor of a block is pre-established. In the step, the count loss correction factor of the block corresponding to the single-photon counting rate of the block may be obtained according to the correspondence. Count loss correction factors of two blocks corresponding to each real LOR may be obtained through the same way.

At step 1005, a count loss correction factor of the real LOR may be obtained according to the count loss correction factors of the two blocks corresponding to the real LOR.

For example, it is assumed that two blocks corresponding to the real LOR, the count loss correction factors of the two blocks are a and b. The count loss correction factor of the real LOR can be $\sqrt{a*b}$.

At step 1006, a count loss correction factor of the virtual LOR may be determined according to the count loss correction factors of the plurality of real LORs corresponding to the virtual LOR in the plurality of scanning states.

For example, the count loss correction factors of the plurality of real LORs corresponding to the virtual LOR are obtained in the steps above. The weighted average may be performed for the count loss correction factors of the plurality of real LORs to obtain the corresponding count loss correction factor of the virtual LOR.

At block 1007, count loss correction may be performed for each of virtual LORs according to the count loss correction factor of the virtual LOR.

In the example, count loss correction may be performed for data of each of the virtual LORs after the count loss correction factor of the virtual LOR is obtained. For example, a true coincidence counting rate of the virtual LOR may be multiplied by the count loss correction factor of the virtual LOR to correct the true coincidence counting rate of the virtual LOR.

In an example, a method of correcting a count loss of a PET system may include procedures as follows.

A virtual system including a plurality of virtual crystals is constructed, where each of the virtual crystals is associated with one or more real crystals each having a same relative position relationship with a respective scanning position on a subject in the PET system as the virtual crystal with the respective scanning position in the virtual system. For each of virtual Lines of Response (LORs) in the virtual system, a plurality of real LORs corresponding to the virtual LOR in the PET system is determined, where each of the real LORs corresponds to a scanning state of the PET system with a continuous incremental scanning mode. A count loss correction factor of the real LOR is determined in each of scanning states. A count loss correction factor of the virtual LOR is determined according to count loss correction factors of the plurality of the real LORs. Count loss correction for the virtual LOR is performed according to the count loss correction factor of the virtual LOR. In an example, respective blocks to which two real crystals corresponding to the real LOR belongs is determined; for each real crystal in each of the blocks in the virtual system, a virtual crystal corresponding to the real crystals is determined; a single-photon counting rate of the real crystal is obtained according to a single-photon counting rate of the virtual crystal; for each of the blocks, a single-photon counting rate of the block is obtained according to single-photon counting rates of the real crystals in the block; respective count loss correction factors of the two blocks is obtained according to the respective single-photon counting rates of the two blocks corresponding to the real LOR; and the count loss correction factor of the real LOR is obtained according to the respective count loss correction factors of the two blocks.

Figure 11:
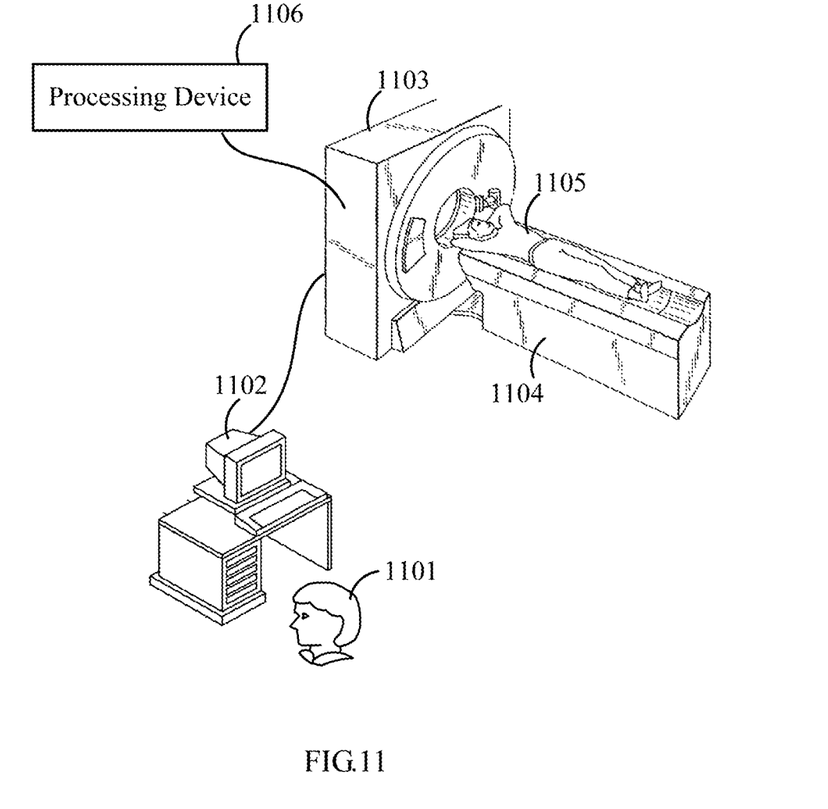
FIG. 11 is a schematic diagram illustrating an application scenario in which a subject is scanned according to an example of the present disclosure.

FIG. 11 is a schematic diagram illustrating an application scenario in which a subject is scanned according to an example of the present disclosure. For example, the subject is scanned through a PET scanning mode. An operator 1101 may operate a detection device 1103 (the detection device 1103 includes crystals) in a PET system through a control console 1102 to perform continuous incremental scan for a subject (e.g., a patient 1105) on a scanning bed 1104.

In the scanning process, each real crystal in the detection device 1103 may send a count of received single-photons to a backend processing device 1106. The processing device 1106 may process the data received by the detecting device and reconstruct an image. The processing device 1106 may execute instructions of the method of correcting a count loss in a continuous incremental PET system as described above.

For example, crystal receiving rates of each of the real crystals of the PET system may be pre-stored in the processing device 1106. The processing device 1106 may determine which scanning positions of the patient 1105 respectively corresponds to the received single-photon counts of the real crystals based on the counts, and sum the counts to respective virtual crystal corresponding to the scanning positions. For example, the processing device 1106 may also calculate a single-photon counting rate of a virtual crystal, calculate a count loss correction factor of a virtual LOR, and perform count loss correction for coincidence data according to the factor.

Figure 12:
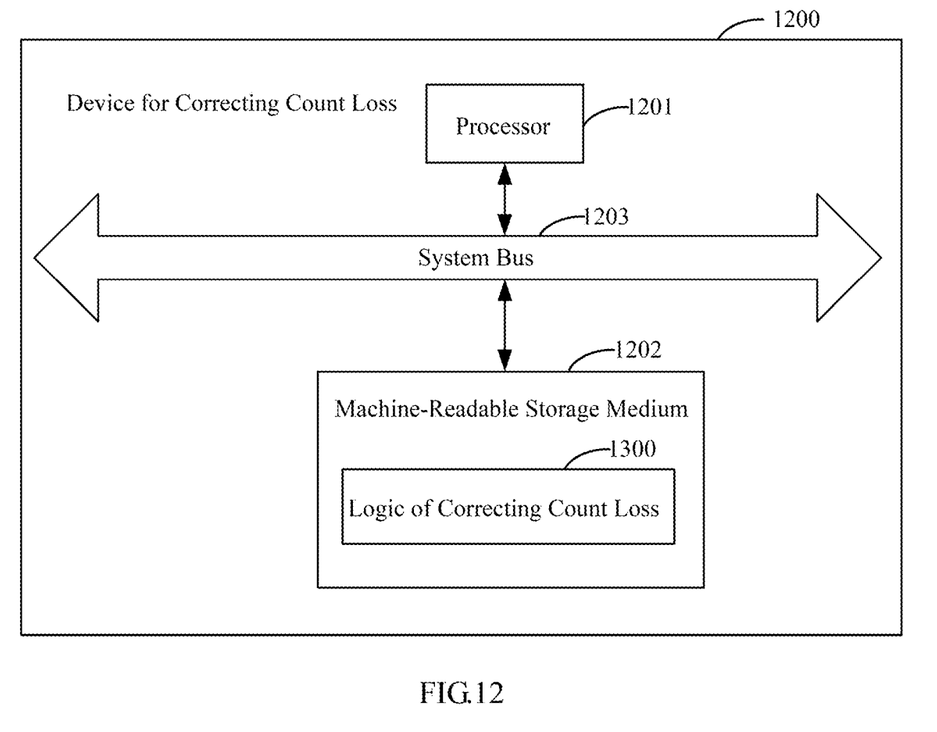
FIG. 12 is a block diagram illustrating a device for reconstructing an image according to an example of the present disclosure.

A device for correcting a count loss is further provided according to an example of the present disclosure. The device may apply to an image reconstructing device in a PET system. FIG. 12 is a block diagram illustrating a device for reconstructing an image according to an example of the present disclosure.

The device 1200 may include a processor 1201 and a machine-readable storage medium 1202 storing machine executable instructions. The processor 1201 may communicate with the machine-readable storage medium 1202 via a system bus 1203, and execute the method of correcting a count loss described above by reading and executing the machine executable instructions corresponding to a count loss correcting control logic in the machine-readable storage medium 1202.

As used herein, the machine-readable storage medium 1202 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 13:
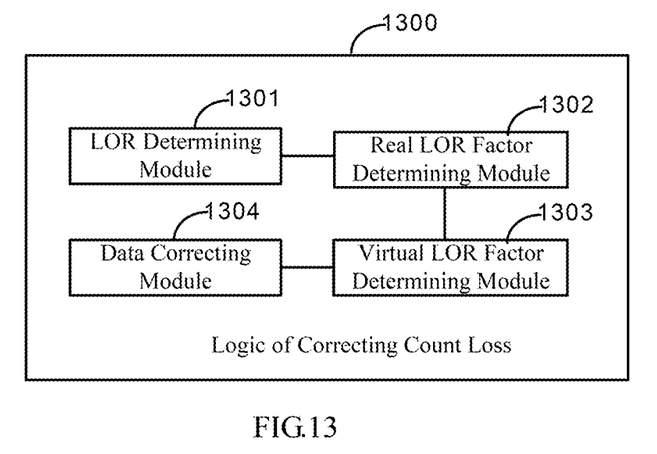
FIG. 13 is a schematic diagram illustrating a structure of logic for correcting a count loss according to an example of the present disclosure.

As shown in FIG. 13, functionally divided, the logic 60 for collecting a count loss above may include modules as follows.

An LOR determining module 1301 is configured to construct a virtual system including a plurality of virtual crystals, where each of the virtual crystals is associated with one or more real crystals each having a same relative position relationship with a respective scanning position on a subject in the PET system as the virtual crystal with the respective scanning position in the virtual system; determine, for each of virtual Lines of Response (LORs) in the virtual system, a plurality of real LORs corresponding to the virtual LOR in the PET system, where each of the real LORs corresponds to a scanning state of the PET system with a continuous incremental scanning mode.

A real LOR factor determining module 1302 is configured to determine a count loss correction factor of the real LOR in each of scanning states.

A virtual LOR factor determining module 1303 is configured to determine a count loss correction factor of the virtual LOR according to count loss correction factors of the plurality of the real LORs.

A data correcting module 1304 is configured to perform count loss correction for the virtual LOR according to the count loss correction factor of the virtual LOR.

In an example, the real LOR factor determining module 1302 is configured to determine respective blocks to which two real crystals corresponding to the real LOR belongs; determine, for each real crystal in each of the blocks in the virtual system, a virtual crystal corresponding to the real crystals; obtain a single-photon counting rate of the real crystal according to a single-photon counting rate of the virtual crystal; obtain, for each of the blocks, a single-photon counting rate of the block according to single-photon counting rates of the real crystals in the block; obtain respective count loss correction factors of the two blocks according to the respective single-photon counting rates of the two blocks corresponding to the real LOR; and obtain the count loss correction factor of the real LOR according to the respective count loss correction factors of the two blocks.

In an example, the real LOR factor determining module 1302 is configured to determine the single-photon counting rate of the virtual crystal according to counts of single-photons sequentially received by real crystals corresponding to the virtual crystal in an axial direction of the PET system when the real crystals sequentially corresponds to a scanning position in the PET system consistent with a scanning position corresponding to the virtual crystal in the virtual system; and obtain the single-photon counting rate of the real crystal according to the single-photon counting rate of the virtual crystal and respective relative receiving rates of the real crystals corresponding to the virtual crystal in the axial direction of the PET system.

In an example, the real LOR factor determining module 1302 is configured to obtain a sum of the single-photon counting rates of a plurality of the real crystals in the block as the single-photon counting rate of the block.

In an example, the real LOR factor determining module 1302 is further configured to determine a correspondence between single-photon counting rate and count loss correction factor of block.

In an example, the virtual LOR factor determining module 1303 is configured to perform weighted average for the count loss correction factors of the plurality of real LORs to obtain an weighted average value; take the weighted average value as the count loss correction factor of the virtual LOR.

The foregoing disclosure is merely illustrative of preferred examples of the disclosure but not intended to limit the disclosure, and any modifications, equivalent substitutions, adaptations thereof made without departing from the spirit and scope of the disclosure shall be encompassed in the claimed scope of the appended claims.

What is claimed is:

1. A method of correcting a count loss in a Positron Emission Computed Tomography (PET) system, the method comprising:

constructing a virtual system comprising a plurality of virtual crystals, wherein each of the virtual crystals is associated with one or more real crystals each having a same relative position relationship with a respective scanning position on a subject in the PET system as the virtual crystal with the respective scanning position in the virtual system;

determining, for each of virtual Lines of Response (LORs) in the virtual system, a plurality of real LORs corresponding to the virtual LOR in the PET system, wherein each of the real LORs corresponds to a scanning state of the PET system with a continuous incremental scanning mode;

determining a count loss correction factor of the corresponding real LOR in each of the scanning states;

determining a count loss correction factor of the virtual LOR according to the determined count loss correction factors of the plurality of real LORs corresponding to the virtual LOR; and performing count loss correction for the virtual LOR according to the determined count loss correction factor of the virtual LOR.

2. The method of claim 1, wherein determining the count loss correction factor of the corresponding real LOR in each of the scanning states comprises:

determining two respective blocks in the PET system to which two real crystals corresponding to the real LOR belongs;

for each real crystal in each of the two respective blocks, determining, in the virtual system, a virtual crystal corresponding to the real crystal and obtaining a single-photon counting rate of the real crystal according to a single-photon counting rate of the determined virtual crystal;

obtaining, for each of the two respective blocks, a single-photon counting rate of the block according to the obtained single-photon counting rates of the real crystals in the block;

obtaining respective count loss correction factors of the two respective blocks according to the respective single-photon counting rates of the two respective blocks corresponding to the real LOR; and determining the count loss correction factor of the real LOR according to the obtained respective count loss correction factors of the two respective blocks.

3. The method of claim 2, wherein obtaining the single-photon counting rate of the real crystal according to the single-photon counting rate of the virtual crystal comprises:

determining the single-photon counting rate of the virtual crystal according to counts of single-photons sequentially received by real crystals corresponding to the virtual crystal in an axial direction of the PET system when the real crystals sequentially correspond to a scanning position in the PET system consistent with a scanning position corresponding to the virtual crystal in the virtual system; and obtaining the single-photon counting rate of the real crystal according to the determined single-photon counting rate of the virtual crystal and a respective relative receiving rate of the real crystal corresponding to the virtual crystal in the axial direction of the PET system.

4. The method of claim 3, wherein determining the single-photon counting rate of the virtual crystal comprises:

determining a single-photon count of the virtual crystal to be a sum of the counts of single-photons received by the real crystals corresponding to the virtual crystal in the axial direction of the PET system; and dividing the single-photon count of the virtual crystal by a scanning time period when the scanning position corresponding to the virtual crystal is scanned in the PET system to obtain the single-photon counting rate of the virtual crystal.

5. The method of claim 3, wherein the respective receiving rates of the real crystals corresponding to the virtual crystal in the axial direction of the PET system are predetermined in a stationary scanning mode of the PET system.

6. The method of claim 2, wherein obtaining, for each of the two respective blocks, the single-photon counting rate of the block according to the single-photon counting rates of the real crystals in the block comprises:

obtaining a sum of the single-photon counting rates of the real crystals in the block as the single-photon counting rate of the block.

7. The method of claim 2, wherein obtaining the respective count loss correction factors of the two respective blocks comprises:

determining the respective count loss correction factor of each of the two respective blocks based on the respective single-photon counting rate of the respective block and predetermined correspondences between respective single-photon counting rates and counting loss correction factors of blocks in the PET system.

8. The method of claim 7, wherein the predetermined correspondences are determined in a stationary scanning mode of the PET system that there is substantially no count loss in particular time periods at a minimum radio activity.

9. The method of claim 1, wherein determining the count loss correction factor of the virtual LOR according to the determined count loss correction factors of the plurality of real LORs comprises:

determining a weighted average for the count loss correction factors of the plurality of real LORs to be the count loss correction factor of the virtual LOR.

10. The method of claim 1, wherein performing count loss correction for the virtual LOR according to the determined count loss correction factor of the virtual LOR comprises:

multiplying a true coincidence counting rate of the virtual LOR by the determined count loss correction factor of the virtual LOR to correct the true coincidence counting rate of the virtual LOR.

11. A device for correcting a count loss of a Positron Emission Computed Tomography (PET) system, the device comprising:

a processor, and a non-transitory machine-readable storage medium storing machine-executable instructions corresponding to logic for correcting a count loss of a PET system, by reading and executing the machine-executable instructions, the processor is caused to:

construct a virtual system comprising a plurality of virtual crystals, wherein each of the virtual crystals is associated with one or more real crystals each having a same relative position relationship with a respective scanning position on a subject in the PET system as the virtual crystal with the respective scanning position in the virtual system;

determine, for each of virtual Lines of Response (LORs) in the virtual system, a plurality of real LORs corresponding to the virtual LOR in the PET system, wherein each of the real LORs corresponds to a scanning state of the PET system with a continuous incremental scanning mode;

determine a count loss correction factor of the corresponding real LOR in each of the scanning states;

determine a count loss correction factor of the virtual LOR according to the determined count loss correction factors of the plurality of real LORs corresponding to the virtual LOR; and perform count loss correction for the virtual LOR according to the determined count loss correction factor of the virtual LOR.

12. The device of claim 11, wherein the processor is caused by the machine-executable instructions to:

determine two respective blocks in the PET system to which two real crystals corresponding to the real LOR belongs;

for each real crystal in each of the blocks in the virtual system, determine, a virtual crystal corresponding to the real crystal and obtain a single-photon counting rate of the real crystal according to a single-photon counting rate of the virtual crystal;

obtain, for each of the blocks, a single-photon counting rate of the block according to the obtained single-photon counting rates of the real crystals in the block;

obtain respective count loss correction factors of the two blocks according to the respective single-photon counting rates of the two blocks corresponding to the real LOR; and determine the count loss correction factor of the real LOR according to the respective count loss correction factors of the two blocks.

13. The device of claim 12, wherein the processor is caused by the machine-executable instructions to:
   determine the single-photon counting rate of the virtual crystal according to counts of single-photons sequentially received by real crystals corresponding to the virtual crystal in an axial direction of the PET system when the real crystals sequentially correspond to a scanning position in the PET system consistent with a scanning position corresponding to the virtual crystal in the virtual system; and
   obtain the single-photon counting rate of the real crystal according to the single-photon counting rate of the virtual crystal and a respective relative receiving rate of the real crystal corresponding to the virtual crystal in the axial direction of the PET system.

14. The device of claim 13, wherein the processor is caused by the machine-executable instructions to:
   determining a single-photon count of the virtual crystal to be a sum of the counts of single-photons received by the real crystals corresponding to the virtual crystal in the axial direction of the PET system; and
   dividing the single-photon count of the virtual crystal by a scanning time period when the scanning position corresponding to the virtual crystal is scanned in the PET system to obtain the single-photon counting rate of the virtual crystal.

15. The device of claim 13, wherein the respective receiving rates of the real crystals corresponding to the virtual crystal in the axial direction of the PET system are predetermined in a stationary scanning mode of the PET system.

16. The device of claim 12, wherein the processor is caused by the machine-executable instructions to:
   obtain a sum of the single-photon counting rates of the real crystals in the block as the single-photon counting rate of the block.

17. The device of claim 8, wherein the processor is caused by the machine-executable instructions further to:
   determine the respective count loss correction factor of each of the two respective blocks based on the respective single-photon counting rate of the respective block and predetermined correspondences between respective single-photon counting rates and counting loss correction factors of blocks in the PET system.

18. The device of claim 11, wherein the processor is caused by the machine-executable instructions further to:
   determine a weighted average for the count loss correction factors of the plurality of real LORs to be the count loss correction factor of the virtual LOR.

19. The device of claim 11, wherein the processor is caused by the machine-executable instructions further to:
   multiply a true coincidence counting rate of the virtual LOR by the determined count loss correction factor of the virtual LOR to correct the true coincidence counting rate of the virtual LOR.

20. A non-transitory computer-readable storage medium having instructions stored thereon which, when executed by one or more processors, cause the one or more processors to perform operations comprising:
   constructing a virtual system comprising a plurality of virtual crystals, wherein each of the virtual crystals is associated with one or more real crystals each having a same relative position relationship with a respective scanning position on a subject in the PET system as the virtual crystal with the respective scanning position in the virtual system;
   determining, for each of virtual Lines of Response (LORs) in the virtual system, a plurality of real LORs corresponding to the virtual LOR in the PET system, wherein each of the real LORs corresponds to a scanning state of the PET system with a continuous incremental scanning mode;
   determining a count loss correction factor of the corresponding real LOR in each of the scanning states;
   determining a count loss correction factor of the virtual LOR according to the determined count loss correction factors of the plurality of real LORs corresponding to the virtual LOR; and
   performing count loss correction for the virtual LOR according to the determined count loss correction factor of the virtual LOR.

* * * * *